(12) United States Patent
Suwa et al.

(10) Patent No.: US 12,546,942 B2
(45) Date of Patent: Feb. 10, 2026

(54) FUSION SPLICING DEVICE

(71) Applicant: Sumitomo Electric Optifrontier Co., Ltd., Yokohama (JP)

(72) Inventors: Takahiro Suwa, Yokohama (JP); Hiroki Akiyama, Yokohama (JP); Kazuyoshi Ooki, Yokohama (JP)

(73) Assignee: Sumitomo Electric Optifrontier Co., Ltd., Yokohama (JP)

( * ) Notice: Subject to any disclaimer, the term of this patent is extended or adjusted under 35 U.S.C. 154(b) by 163 days.

(21) Appl. No.: 18/551,206

(22) PCT Filed: Mar. 23, 2022

(86) PCT No.: PCT/JP2022/013722
§ 371 (c)(1),
(2) Date: Sep. 19, 2023

(87) PCT Pub. No.: WO2022/210213
PCT Pub. Date: Oct. 6, 2022

(65) Prior Publication Data
US 2024/0192444 A1 Jun. 13, 2024

(30) Foreign Application Priority Data
Mar. 31, 2021 (JP) ................................. 2021-060826

(51) Int. Cl.
*G02B 6/255* (2006.01)
(52) U.S. Cl.
CPC ......... *G02B 6/2555* (2013.01); *G02B 6/2553* (2013.01); *G02B 6/2556* (2013.01)
(58) Field of Classification Search
CPC ........ G02B 6/255–2558; G02B 6/2555; G02B 6/2553; G02B 6/2556
See application file for complete search history.

(56) References Cited

U.S. PATENT DOCUMENTS

2004/0047572 A1 3/2004 Hattori
2009/0010601 A1 1/2009 Huang et al.
(Continued)

FOREIGN PATENT DOCUMENTS

CN 108363143 A 8/2018
CN 112130256 A 12/2020
(Continued)

OTHER PUBLICATIONS

International Search Report issued in Patent Application No. PCT/JP2022/013722 dated May 17, 2022.
(Continued)

*Primary Examiner* — Jeffrey M Wollschlager
(74) *Attorney, Agent, or Firm* — McDonald Hopkins LLC

(57) ABSTRACT

A fusion splicing device according to an embodiment is a fusion splicing device of an optical fiber performing fusion-splicing by position-aligning the optical fiber that is a splicing target in a V-shaped groove. The fusion splicing device includes a microscope receiving light from a light source and passing through an optical fiber mounted on a V-shaped groove to obtain luminance information, a V-shaped groove driving unit moving the V-shaped groove, a storage unit storing a position of the V-shaped groove at which the microscope is focused, and an identification unit identifying the optical fiber. The position of the microscope is fixed. The V-shaped groove driving unit moves the V-shaped groove to a position stored in the storage unit. The identification unit identifies the optical fiber moved to the position.

4 Claims, 4 Drawing Sheets

(56) References Cited

U.S. PATENT DOCUMENTS

| | | |
|---|---|---|
| 2014/0044339 A1 | 2/2014 | Onozaki et al. |
| 2016/0216448 A1* | 7/2016 | Sato .................... G02B 6/2553 |
| 2020/0056960 A1 | 2/2020 | Kise et al. |
| 2022/0099895 A1 | 3/2022 | Nakamura et al. |

FOREIGN PATENT DOCUMENTS

| | | | |
|---|---|---|---|
| JP | 63222206 | * | 9/1988 |
| JP | 2001-305372 A | | 10/2001 |
| JP | 2002-169050 A | | 6/2002 |
| JP | 2004-341452 A | | 12/2004 |
| JP | 2010-261730 A | | 11/2010 |
| JP | 2013-054192 A | | 3/2013 |
| JP | 2020-020997 A | | 2/2020 |
| WO | 2020/179927 A1 | | 9/2020 |

OTHER PUBLICATIONS

Written Opinion issued in Patent Application No. PCT/JP2022/013722 dated May 17, 2022.

* cited by examiner

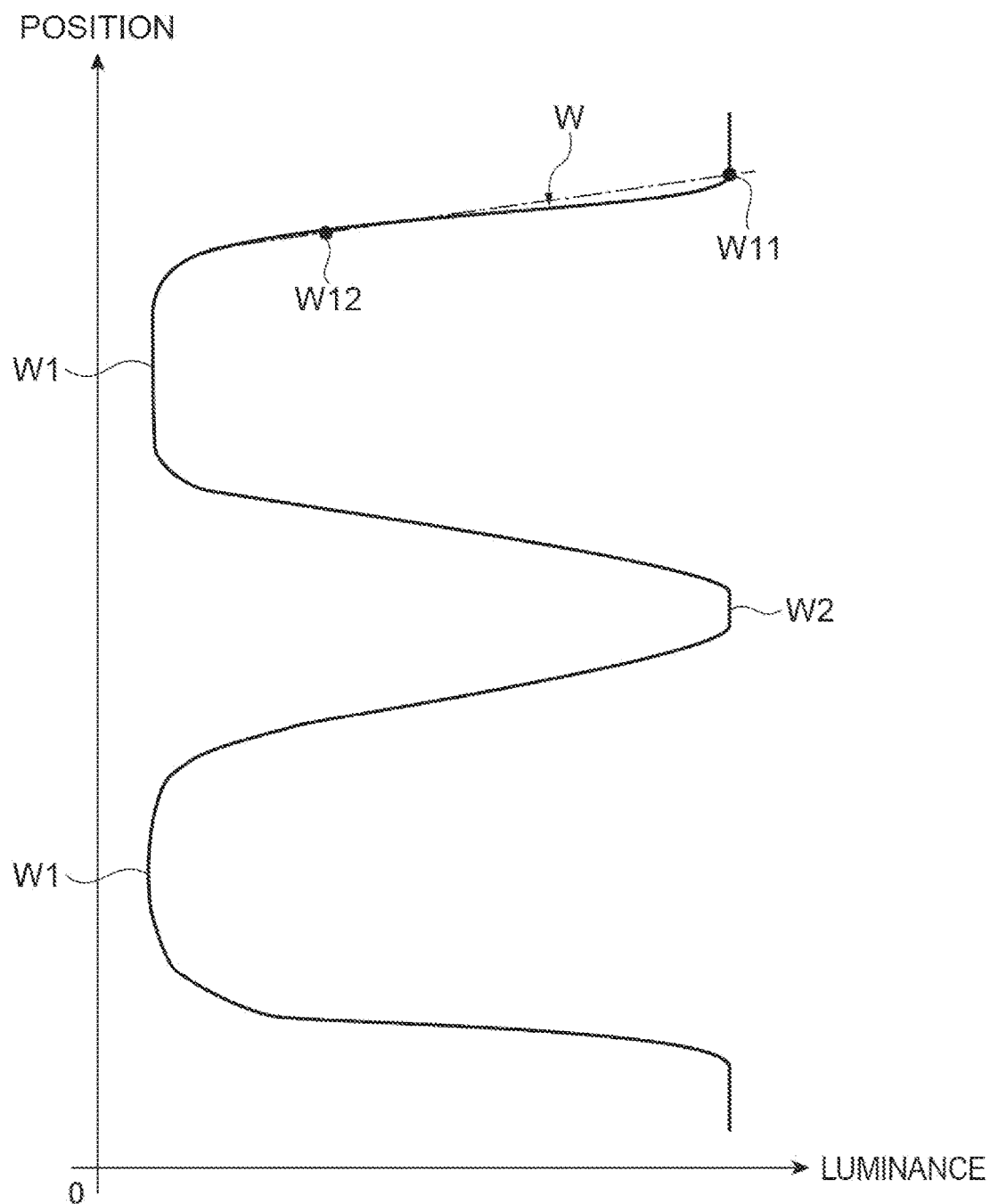

FUSION SPLICING DEVICE

TECHNICAL FIELD

The present disclosure relates to a fusion splicing device of an optical fiber.

This application is based upon and claims the benefit of priority from Japanese Patent Application No. 2021-060826 filed on Mar. 31, 2021, the entire contents of which are incorporated herein by reference.

BACKGROUND ART

Patent Literature 1 describes a fusion splicing device. A fusion splicing device includes an image observation mechanism, an image processing unit, and a fusion splicing mechanism. The image observation mechanism has a pair of microscopes for imaging a pair of optical fibers held in an abutted state by the fusion splicing mechanism and a pair of focus driving units for focus adjustment. The pair of microscopes images the pair of optical fibers from two directions. As each microscope, the microscope with high magnification and high resolution is used. Each focus driving unit moves each microscope to perform the focus adjustment of each microscope. The image processing unit has an image acquisition means and a waveform acquisition means. The image acquisition means acquires an imaged screen of the optical fiber. The waveform acquisition means generates a luminance waveform obtained by converting a cross section of the optical fiber into a luminance profile from the captured image.

Patent Literature 2 describes a fusion splicer and an optical fiber determination method. The fusion splicer includes a pair of holding mechanisms, an imaging unit imaging optical fiber core wires, a fusion unit fusing a pair of optical fiber core wires, and a control unit controlling the imaging unit and the fusion unit. The pair of holding mechanisms hold each of the pair of optical fiber core wires. The imaging unit has a light source and an imaging camera. The light source irradiates with light from the side of the end of the optical fiber, and the imaging camera captures a lateral transmission image of the optical fiber. The control unit has a determination unit determining the optical fiber. The determination unit creates a luminance distribution in a direction perpendicular to the optical axis of the optical fiber from the lateral transmission image captured by the imaging unit.

Patent Literature 3 describes a fusion splicing system. The fusion splicing system includes an imaging unit acquiring radial image data of an optical fiber and an image processing unit performing image processing on the radial image data. The imaging unit includes two image sensors and two light sources. The two image sensors are arranged at positions where the respective optical axes are perpendicular to each other. The two image sensors and the two light sources are arranged at positions where light from each light source is radially transmitted through the optical fiber and received by each image sensor. The image processing unit changes a distance from the image sensor to the optical fiber so that a structural parameter of the optical fiber represented by the radial image data changes little by little. The image processing unit adjusts the focus by changing the distance from the image sensor to the optical fiber and analyzes the radial image data obtained by this adjustment.

CITATION LIST

Patent Literature

Patent Literature 1: Japanese Unexamined Patent Publication No. 2002-169050

Patent Literature 2: Japanese Unexamined Patent Publication No. 2013-54192

Patent Literature 3: Japanese Unexamined Patent Publication No. 2020-20997

SUMMARY OF INVENTION

A fusion splicing device according to the present disclosure is a fusion splicing device of an optical fiber position-aligning the optical fiber that is a splicing target in a V-shaped groove and performing fusion splicing. The fusion splicing device includes a microscope obtaining luminance information by receiving light emitted from a light source and passing through the optical fiber mounted on the V-shaped groove, a V-shaped groove driving unit moving the V-shaped groove, a storage unit storing a position of the V-shaped groove at which the microscope is focused on the optical fiber, and an identification unit identifying an optical fiber. A position of the microscope is fixed. The V-shaped groove driving unit moves the V-shaped groove to a position stored in the storage unit. The identification unit identifies the optical fiber moved to the position.

BRIEF DESCRIPTION OF DRAWINGS

FIG. 4 is a graph illustrating a relationship between a radial position of the optical fiber and luminance.

DESCRIPTION OF EMBODIMENTS

Figure 1:
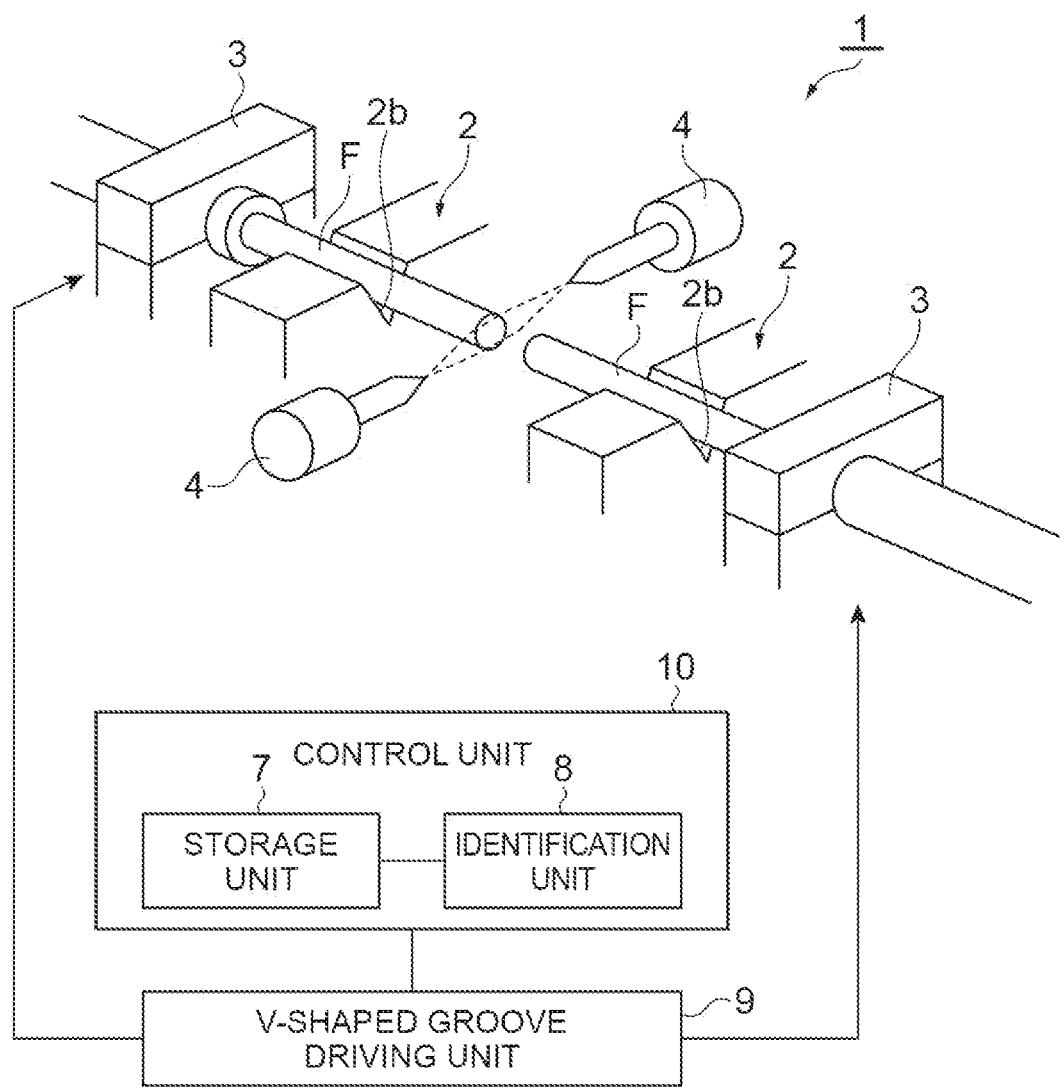
FIG. 1 is a diagram describing an outline of a fusion splicing device according to an embodiment.

In a fusion splicing device or the like of the related art, a microscope receiving light passing through an optical fiber moves for focus adjustment. However, in some cases, the microscope is fixed. When the microscope is fixed, the luminance waveform from the light passing through the optical fiber may not be generated clearly. In this case, it may be difficult to identify the optical fiber.

An object of the present disclosure is to provide a fusion splicing device that can identify optical fibers with high accuracy even when a microscope receiving light passing through the optical fibers is fixed.

Description of Embodiments of Present Disclosure

First, the embodiments of the present disclosure will be listed and described. A fusion splicing device according to an embodiment is a fusion splicing device of an optical fiber performing fusion-splicing by position-aligning the optical fiber that is a splicing target in a V-shaped groove. The fusion splicing device includes a microscope receiving light emitted from a light source and passing through the optical fiber mounted on the V-shaped groove to obtain luminance information, a V-shaped groove driving unit moving the V-shaped groove, a storage unit storing a position of the V-shaped groove at which the microscope is focused, and an identification unit identifying the optical fiber. The position of the microscope is fixed. The V-shaped groove driving unit moves the V-shaped groove to a position stored in the storage unit. The identification unit identifies the optical fiber moved to the position.

In this fusion splicing device, the optical fiber that is a splicing target is mounted on the V-shaped groove and position-aligned in the V-shaped groove. The light is emitted from the light source to the optical fiber mounted on the V-shaped groove. The microscope obtains the luminance information of the light passing through the optical fiber by receiving the light emitted from the optical fiber. The fusion splicing device is provided with the V-shaped groove driving unit, and the V-shaped groove on which the optical fiber is mounted is movable by the V-shaped groove driving unit. The storage unit stores the position of the V-shaped groove at which the microscope is focused on the optical fiber. The V-shaped groove driving unit moves the V-shaped groove to the position stored in the storage unit, and the identification unit identifies the optical fiber moved to the position. Therefore, the storage unit stores the position of the V-shaped groove at which the microscope is focused, and the V-shaped groove driving unit moves the V-shaped groove to the position stored in the storage unit, so that the clear luminance waveform of the optical fiber can be obtained even when the microscope is fixed. That is, the V-shaped groove moves to the position at which the microscope is focused, and the identification unit identifies the optical fiber moved to that position, so that the identification of the optical fiber can be performed with high accuracy even when the position of the microscope is fixed.

The storage unit may store a reference range of feature information of the luminance when the microscope is focused on the optical fiber. In this case, the reference range of the feature information of the luminance when the microscope is focused on the optical fiber is stored. Therefore, the V-shaped groove on which the new optical fiber is mounted is moved by using the reference range of the feature information, so that the V-shaped groove can be moved to a position at which the focus on the new optical fiber is achieved, and the identification of the optical fiber can be performed with high accuracy.

When the feature information of the luminance obtained from the optical fiber mounted on the V-shaped groove deviates from the reference range of the feature information stored in the storage unit, the V-shaped groove driving unit may move the V-shaped groove to the position where the feature information of the luminance of the optical fiber is included in the reference range of the feature information stored in the storage unit. In this case, the storage unit stores the reference range of the feature information of the luminance when the focus on the optical fiber is achieved, and the V-shaped groove driving unit moves the V-shaped groove to the position where the feature information of the luminance is within the reference range of the feature information stored in the storage unit. Therefore, the reference range of the feature information of the luminance of the optical fiber obtained by the microscope can be effectively used for position-aligning the V-shaped groove, and the identification of the optical fiber can be performed with high accuracy even when the microscope is fixed.

The identification unit may identify the optical fiber by comparing second feature information of the luminance obtained from the optical fiber mounted on the V-shaped groove with the second feature information stored in the storage unit. In this case, the identification unit identifies the optical fiber mounted on the V-shaped groove by using the second feature information of the luminance when the focus is achieved, which is stored in advance in the storage unit. Therefore, the identification unit can identify the optical fiber with high accuracy by using the second feature information of the luminance stored in advance.

Details of Embodiment of Present Disclosure

A specific example of the fusion splicing device according to an embodiment of the present disclosure will be described. In the description of the drawings, the same or corresponding elements are denoted by the same reference numerals, and duplicate descriptions are omitted as appropriate. The drawings may be partially simplified or exaggerated for easy understanding, and the dimensional ratios and the like are not limited to those described in the drawings.

First, the configuration of the fusion splicing device according to this embodiment will be described with reference to FIG. 1. FIG. 1 is a diagram describing an outline of the fusion splicing device according to this embodiment. As illustrated in FIG. 1, the fusion splicing device 1 is a fusion splicer fusion-splicing a pair of optical fibers F to each other. The fusion splicing device 1 includes a V-shaped groove clamp 2 having a V-shaped groove 2b, a coating clamp 3, a pair of discharge electrodes 4, a V-shaped groove driving unit 9 for driving the V-shaped groove clamp 2, and a control unit 10. The control unit 10 has a storage unit 7 and an identification unit 8.

The V-shaped groove clamp 2 and the coating clamp 3 are members for supporting the optical fiber F to be fusion-spliced. The optical fiber F that is a splicing target is position-aligned in the V-shaped groove 2b of the V-shaped groove clamp 2. The V-shaped groove clamp 2 supports a portion of the bare fiber from which the coating is removed from the optical fiber F to expose the glass portion. The coating clamp 3 holds the coated portion of the optical fiber F. In the fusion splicing device 1, by the V-shaped groove clamp 2 and the coating clamp 3, the tips of the pair of optical fibers F are supported to face each other, and the fusion-splicing is performed.

The pair of discharge electrodes 4 are arranged so as to face each other along a direction crossing (for example, perpendicular to) the direction in which the optical fiber F extends. The pair of discharge electrodes 4 fusion-splice the tips of the pair of optical fibers F by discharge. In the fusion splicing device 1, the optical fibers F are aligned in the V-shaped grooves 2b.

In the fusion splicing device 1 performs position-alignment of the pair of optical fibers F by the V-shaped groove driving unit 9 and the control unit 10. The V-shaped groove driving unit 9 and the control unit 10 align the axes of the pair of optical fibers F so that the pair of optical fibers F are aligned on a straight line. After that, the discharge electrode 4 fusion-splices the tips of the pair of optical fibers F by discharge. For example, the control unit 10 controls the discharge current or the discharge time of the discharge electrode 4 so that the fusion-splicing is performed under the fusion condition suitable for the type of the optical fiber F.

Figure 2:
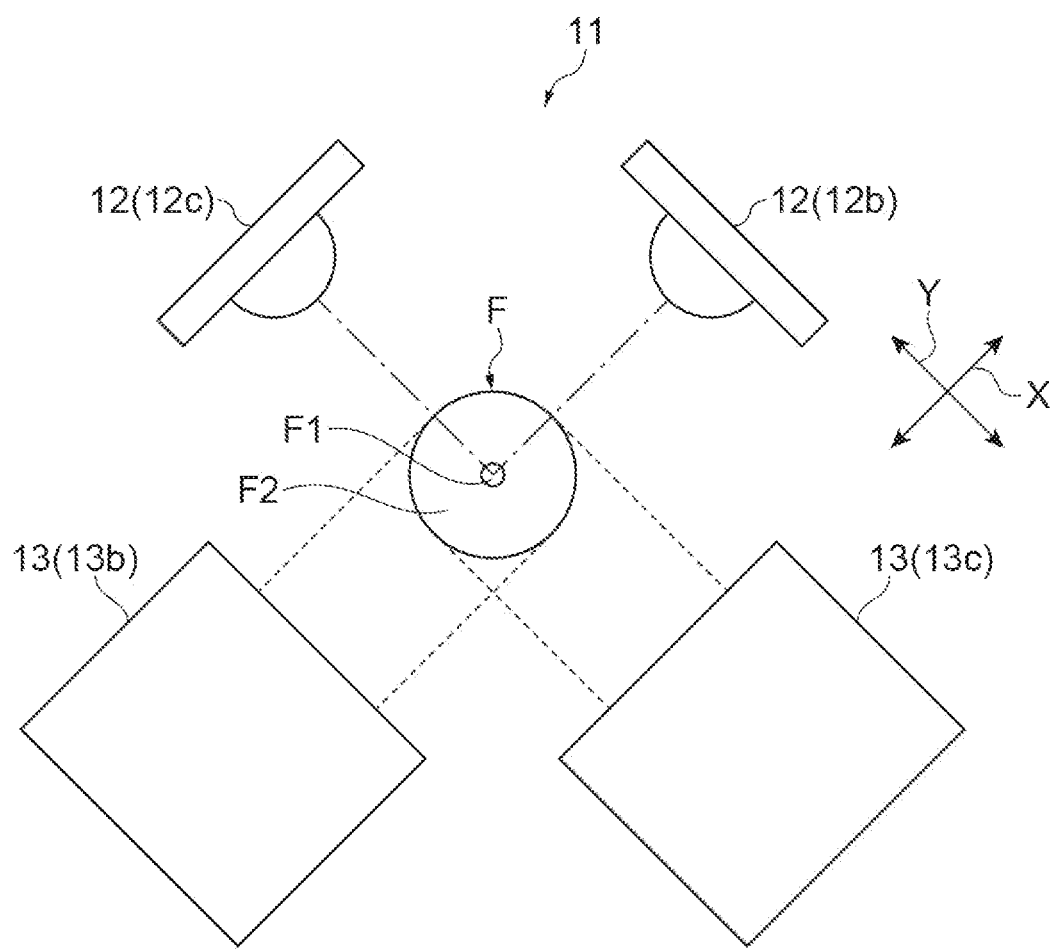
FIG. 2 is a diagram illustrating an optical system for observing an optical fiber in the fusion splicing device of FIG. 1.

The fusion splicing device 1 includes an image observation mechanism 11 obtaining the luminance information of the light passing through the optical fiber F arranged on the V-shaped groove 2b of the V-shaped groove clamp 2. FIG. 2 illustrates a configuration of the image observation mechanism 11. The image observation mechanism 11 has, for example, a light source 12 and a microscope 13. The light source 12 includes a first light source 12b and a second light source 12c, and the microscope 13 includes a first microscope 13b and a second microscope 13c. The first light source 12b and the first microscope 13b are arranged along the X direction with the optical fiber F interposed therebetween.

The second light source 12c and the second microscope 13c are arranged along the Y direction intersecting the X direction with the optical fiber F interposed therebetween. The angle between the X direction and the Y direction is, for example, 60° or more and 120° or less. The first light source 12b emits the light to the optical fiber F along the X direction, and the second light source 12c emits the light to the optical fiber F along the Y direction. The first microscope 13b obtains the luminance information of the light passing through the optical fiber F by receiving the light emitted from the first light source 12b along the X direction. The second microscope 13c obtains the luminance information of the light passing through the optical fiber F by receiving the light emitted from the second light source 12c along the Y direction.

The configuration and function of the first light source 12b are, for example, the same as the configuration and function of the second light source 12c. The configuration and function of the first microscope 13b are, for example, the same as the configuration and function of the second microscope 13c. Therefore, in the following description, unless it is necessary to particularly identify the light sources and the microscopes, the first light source 12b and the second light source 12c are collectively described as the light source 12, and the first microscope 13b and the second microscope 13c are collectively described as the microscope 13.

Figure 3:
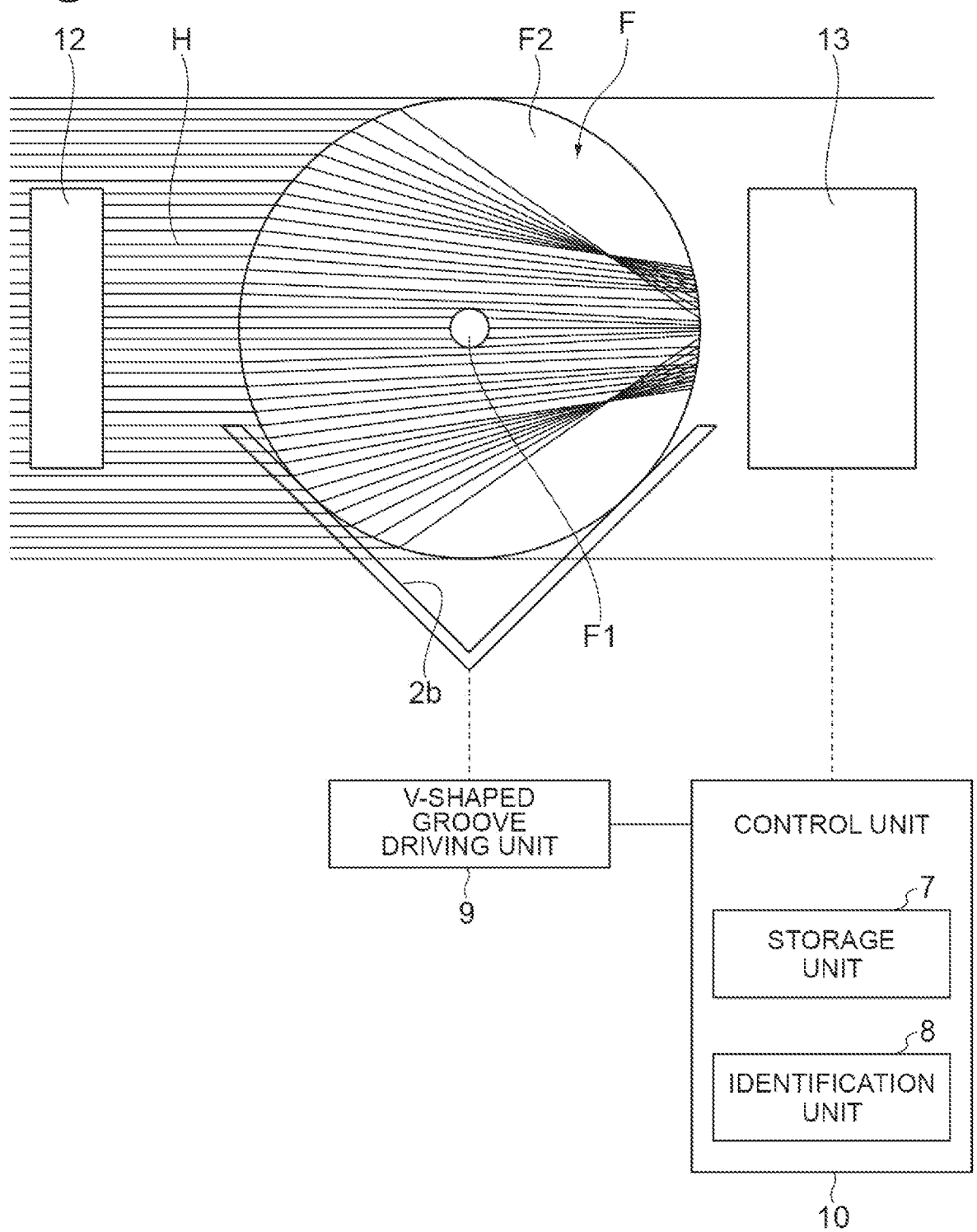
FIG. 3 is a diagram schematically illustrating a positional relationship between a light source and a microscope in the optical system of FIG. 2 and an optical fiber mounted on a V-shaped groove.

FIG. 3 is a diagram schematically illustrating a positional relationship among the light source 12, the optical fiber F, and the microscope 13. As illustrated in FIG. 3, the light source 12, the optical fiber F, and the microscope 13 are arranged in a straight line. The light source 12 is, for example, a light emitting element such as a light emitting diode. As an example, the light source 12 emits the light H that is red light. The microscope 13 obtains the luminance information of the light passing through the optical fiber F by receiving the light H emitted from the light source 12 to the optical fiber F mounted on the V-shaped groove 2b.

The microscope 13 includes, for example, an observation lens and an imaging device. For example, the microscope 13 is a charge-coupled device camera (CCD camera), a complementary metal oxide semiconductor camera (CMOS camera), or the like. The position of the microscope 13 is fixed in the fusion splicing device 1, and the position of the microscope 13 remains unchanged. The observation result by the microscope 13 is acquired as the luminance information of the light. The luminance information of the light passing through the optical fiber F acquired by the microscope 13 is transmitted to the control unit 10.

The V-shaped groove driving unit 9 is driven, for example, based on a control signal input from the control unit 10. The V-shaped groove driving unit 9 moves the V-shaped groove 2b. As the control unit 10, for example, a central processing unit (CPU) configured with one or a plurality of integrated circuits (ICs) is used. The control unit 10 acquires the luminance information of the light passing through the optical fiber F from the microscope 13. The luminance information of the optical fiber F together with the position information is stored in the storage unit 7. For example, the control unit 10 acquires a center position of a core F1 of the optical fiber F from the acquired luminance information and position information. The control unit 10 may output the control signal to the V-shaped groove driving unit 9 by using the acquired result to control the V-shaped groove driving unit 9.

The control unit 10 acquires a luminance waveform W which is a distribution of the luminance with respect to the position corresponding to the radial direction of the optical fiber from the acquired luminance information and position information of the optical fiber F. FIG. 4 illustrates an exemplary luminance waveform W of the optical fiber F acquired by the control unit 10. As illustrated in FIGS. 3 and 4, the portion corresponding to the core F1 is displayed with high luminance, and the portion corresponding to a clad F2 is displayed with low luminance. As an example, when the relative position corresponding to the radial direction of the optical fiber reaches the optical fiber F from 0, the luminance decreases. When the relative position corresponding to the radial direction of the optical fiber reaches the portion corresponding to the core F1 of the optical fiber F, the luminance increases. A peak W2 with high luminance appears in the luminance waveform W in the vicinity of the center interposed between a pair of valleys W1 with low luminance.

The control unit 10 acquires an outer diameter of the optical fiber F by using the acquired luminance information and position information. For example, the control unit 10 extracts a bright portion corresponding to the peak W2 as a portion corresponding to the core and acquires a width of the bright portion. Then, the control unit 10 acquires the feature information of the luminance (for example, the luminance waveform W).

For example, the feature information may be a core diameter, an outer diameter of the optical fiber F, a ratio of the core diameter to the clad diameter, luminance at the center position of the core F1, a sum of the luminance near the core F1, a difference in average luminance of the clad F2 portion and the core F1 portion, average luminance of the peak W2, or the like. Further, the feature information may be the inclination (edge) of the straight line portion extending from W11 to W12 of the specific portion corresponding to the outer surface of the optical fiber F. Furthermore, the feature information may be one or a combination of two or more of the feature information among the feature information described above.

The storage unit 7 stores, for example, the luminance waveforms W of a plurality of types of optical fibers F in advance. The storage unit 7 stores the position of the V-shaped groove 2b at which the microscope 13 is focused on the optical fiber F from the luminance waveform W. Storing the position of the V-shaped groove 2b by the storage unit 7 is performed, for example, for each fusion splicing device 1 (each fusion splicing device 1).

A new optical fiber F (optical fiber F to be fusion-spliced) is mounted on the V-shaped groove 2b, and the V-shaped groove driving unit 9 moves the V-shaped groove 2b to the position stored in the storage unit 7. Accordingly, the microscope 13 can be focused on the optical fiber F by moving the V-shaped groove 2b. For example, the control unit 10 acquires the feature information of the luminance from the new optical fiber F and determines whether or not the acquired feature information is within the reference range of the feature information stored in the storage unit 7. The "reference range" is, for example, a reference value ±X % (X is a real number, as an example, X=15). In this case, the control unit 10 determines that the difference between the feature information acquired from the new optical fiber F and the feature information stored in the storage unit 7 is within the reference range when the difference is ±X % or less of the reference value. The "reference range" may be a range of value or may be a reference value (the value itself). The reference range of the feature information is stored in the storage unit 7, and the reference range is stored as, for example, a reference pass/fail determination table. For example, when the feature information acquired from the new optical fiber F is discrete values, the above determination may be performed by using the pass/fail determination table.

For example, when the control unit 10 determines that the feature information acquired from the new optical fiber F is within the reference range of the feature information stored in the storage unit 7 (focus is achieved), the identification unit 8 performs identification of the optical fiber F. The feature information used to determine whether or not the focus is achieved by the control unit 10 may be, as described above, the core diameter, the outer diameter of the optical fiber F, the ratio between the core diameter and the clad diameter, the luminance at the center position of the core F1, the sum of the luminance near the core F1, the difference in average luminance between the clad F2 portion and the core F1 portion, the average luminance of the peak W2, or the like. Further, the feature information may be the inclination (edge) of the straight line portion extending from W11 to W12 of the specific portion corresponding to the outer surface of the optical fiber F. Furthermore, the feature information may be one or a combination of two or more of the feature information among the feature information described above.

Further, when the control unit 10 determines that the feature information acquired from the new optical fiber F is out of the reference range of the feature information stored in the storage unit 7 (focus is not achieved), the V-shaped groove driving unit 9 moves the V-shaped groove 2b to the position where the feature information acquired from the new optical fiber F is within the reference range of the feature information stored in the storage unit 7 (for example, finely adjusts the position of the V-shaped groove 2b). In the state where the focus on the optical fiber F is achieved at which the feature information acquired from the new optical fiber F is within the reference range of the feature information stored in the storage unit 7, the identification unit 8 performs the identification of the optical fiber F. The identification unit 8 identifies the type of the optical fiber F from the imaging result of the microscope 13 for the optical fiber F in the V-shaped groove 2b moved by the V-shaped groove driving unit 9. For example, the identification unit 8 identifies the type of the optical fiber F, such as whether the optical fiber F is a single-mode fiber or a multi-mode fiber, from the second feature information of the luminance that is acquired in the storage unit 7 in advance. The second feature information used by the identification unit 8 may be the core diameter, the outer diameter of the optical fiber F, the ratio of the core diameter to the clad diameter, the luminance at the center position of the core F1, the sum of the luminance near the core F1, the difference in average luminance of the clad F2 portion and the core F1 portion, the average luminance of the peak W2, or the like. Further, the second feature information may be the inclination (edge) of the straight line portion extending from W11 to W12 of the specific portion corresponding to the outer surface of the optical fiber F. Furthermore, the second feature information may be one or a combination of two or more of the second feature information among the second feature information described above.

Hereinafter, an example of an optical fiber identification method according to this embodiment will be described. For example, in the fusion splicing device 1 before shipment, the reference range of the feature information of the luminance is stored in advance in the storage unit 7. First, the optical fiber F as a reference is mounted on the V-shaped groove 2b, and the V-shaped groove driving unit 9 moves the V-shaped groove 2b. As a result, the microscope 13 is focused on the optical fiber F with reference to the reference range of the stored feature information. Then, the storage unit 7 stores the position of the V-shaped groove 2b when the focus is achieved. For example, the fusion splicing device 1 is shipped through the above processes.

After that, when a new optical fiber F is mounted on the V-shaped groove 2b, the V-shaped groove driving unit 9 moves the V-shaped groove 2b to the position stored in the storage unit 7. For example, the control unit 10 acquires the feature information of the luminance from the optical fiber F mounted on the V-shaped groove 2b. When the feature information of the luminance obtained from the optical fiber F mounted on the V-shaped groove 2b is within the reference range of the feature information stored in the storage unit 7, that is, when the microscope 13 is focused on the optical fiber F, the identification unit 8 performs the identification of the optical fiber. On the other hand, when the feature information of the luminance obtained from the optical fiber F mounted on the V-shaped groove 2b deviates from the reference range of the feature information stored in the storage unit 7, that is, when the microscope 13 is not focused on the optical fiber F, the V-shaped groove driving unit 9 moves the V-shaped groove 2b to the position where the feature information of the luminance of the optical fiber F is included in the reference range of the feature information stored in the storage unit 7. At this time, for example, the V-shaped groove driving unit 9 finely adjusts the position of the V-shaped groove 2b, and the identification unit 8 identifies the optical fiber F. The identification unit 8 identifies the optical fiber F by comparing, for example, the feature information of the luminance obtained from the optical fiber F mounted on the V-shaped groove 2b with the feature information of the luminance stored in the storage unit 7.

Next, functions and effects obtained from the fusion splicing device 1 according to this embodiment will be described. In the fusion splicing device 1, the optical fiber F that is a splicing target is mounted on the V-shaped groove 2b and position-aligned in the V-shaped groove 2b. The light H is emitted from the light source 12 to the optical fiber F mounted on the V-shaped groove 2b. The microscope 13 receives the light H emitted to the optical fiber F and, thus, obtains the luminance information of the light passing through the optical fiber F. The fusion splicing device 1 includes a V-shaped groove driving unit 9. The V-shaped groove 2b on which the optical fiber F is mounted is allowed to be movable by the V-shaped groove driving unit 9. The storage unit 7 stores the position of the V-shaped groove 2b at which the microscope 13 is focused on the optical fiber F. The V-shaped groove driving unit 9 moves the V-shaped groove 2b to the position stored in the storage unit 7. The identification unit 8 identifies the optical fiber F that has moved to the position.

Therefore, the storage unit 7 stores the position of the V-shaped groove 2b at which the microscope 13 is focused, and the V-shaped groove driving unit 9 moves the V-shaped groove 2b to the position stored in the storage unit 7, so that the clear luminance waveform W of the optical fiber F can be obtained even when the microscope 13 is fixed. That is, the V-shaped groove 2b is moved to the position at which the microscope 13 is focused, and the identification unit 8 identifies the optical fiber F moved to that position, so that the identification of the optical fiber F can be performed with high accuracy even when the position of the microscope 13 is fixed.

The storage unit 7 may store a reference range of the feature information of the luminance (for example, the luminance waveform W) when the microscope 13 is focused on the optical fiber F. The V-shaped groove driving unit 9 may move the V-shaped groove 2b to the position where the feature information of the luminance is included in the reference range of the feature information stored in the storage unit 7. In this case, the storage unit 7 stores the reference range of the feature information of the luminance when the focus on the optical fiber F is achieved, and the V-shaped groove driving unit 9 moves the V-shaped groove 2b to the position at which the feature information of the luminance is included in the reference range of the feature information stored in the storage unit 7. Therefore, the reference range of the feature information of the luminance of the optical fiber F obtained by the microscope 13 can be effectively used for position-aligning the V-shaped groove 2b, and the identification of the optical fiber F can be performed with high accuracy even when the microscope 13 is fixed.

The storage unit 7 may store in advance the position of the V-shaped groove 2b, which is the feature information of the luminance being the feature information when the microscope 13 is focused on the optical fiber F. The V-shaped groove driving unit 9 may move the V-shaped groove 2b to the position stored in the storage unit 7. In this case, the storage unit 7 stores the position of the V-shaped groove 2b at which the feature information of the luminance of the optical fiber F obtained by the microscope 13 becomes the feature information when the focus is achieved, the V-shaped groove driving unit 9 moves the V-shaped groove 2b to that position. Therefore, the storage unit 7 stores in advance the position of the V-shaped groove 2b at which the focus is achieved, and the V-shaped groove driving unit 9 moves the V-shaped groove 2b to that position, so that the identification of the optical fiber F can be performed with high accuracy by quickly moving the V-shaped groove 2b to an appropriate position. Herein, the "position of the V-shaped groove" may be a relative position obtained by setting another specific component of the fusion splicing device as a reference, and may be, for example, a relative position obtained by setting the microscope 13 as a reference.

The identification unit 8 may identify the optical fiber F by comparing the second feature information of the luminance obtained from the optical fiber F mounted on the V-shaped groove 2b with the second feature information stored in the storage unit 7. In this case, the identification unit 8 identifies the optical fiber F mounted on the V-shaped groove by using the second feature information of the luminance stored in advance in the storage unit 7. Therefore, the identification unit 8 can identify the optical fiber F with high accuracy by using the second feature information of the luminance stored in advance. The feature information of the luminance used for focusing and the second feature information of the luminance used for identification may be the same or different.

Heretofore, the embodiment of the fusion splicing device according to the present disclosure has been described. However, the invention is not limited to the embodiment described above. That is, it is easily recognized by those skilled in the art that various modifications and changes of the present invention can be made within the scope of the spirit disclosed in the claims. The configuration of each component of the fusion splicing device can be changed as appropriate within the scope of the above spirit. That is, a shape, size, number, material, and arrangement of each component of the fusion splicing device according to the present disclosure are not limited to the above-described embodiments and can be changed as appropriate.

REFERENCE SIGNS LIST

1: fusion splicing device, 2: V-shaped groove clamp, 2b: V-shaped groove, 3: coating clamp, 4: discharge electrode, 7: storage unit, 8: identification unit, 9: V-shaped groove driving unit, 10: control unit, 11: image observation mechanism, 12: light source, 12b: first light source, 12c: second light source, 13: microscope, 13b: first microscope, 13c: second microscope, F: optical fiber, F1: core, F2: clad, H: light, W: luminance waveform, W1: valley, W2: peak, W11: portion, W12: portion.

What is claimed is:

1. A fusion splicing device of aligning a position of an optical fiber as a splicing target with a V-shaped groove and performing fusion splicing, the fusion splicing device comprising:
    a microscope obtaining luminance information by receiving light emitted from a light source and passing through the optical fiber mounted on the V-shaped groove;
    a V-shaped groove driving unit moving the V-shaped groove;
    a storage unit storing a position of the V-shaped groove at which the microscope is focused on the optical fiber; and
    an identification unit identifying an optical fiber,
    wherein a position of the microscope is fixed,
    wherein the V-shaped groove driving unit moves the V-shaped groove to a position stored in the storage unit, and
    wherein the identification unit identifies the optical fiber moved to the position,
    wherein the storage unit stores a reference range of feature information of luminance when the microscope is focused on the optical fiber.

2. The fusion splicing device according to claim 1, wherein, when the feature information of the luminance obtained from the optical fiber mounted on the V-shaped groove deviates from the reference range of the feature information stored in the storage unit, the V-shaped groove driving unit moves the V-shaped groove to a position where the feature information of the luminance of the optical fiber is included in the reference range of the feature information stored in the storage unit.

3. The fusion splicing device according to claim 1, wherein the identification unit identifies the optical fiber by comparing second feature information of the luminance obtained from the optical fiber mounted on the V-shaped groove with second feature information stored in the storage unit.

4. A fusion splicing device of aligning a position of an optical fiber as a splicing target with a V-shaped groove and performing fusion splicing, the fusion splicing device comprising:
    a microscope obtaining luminance information by receiving light emitted from a light source and passing through the optical fiber mounted on the V-shaped groove;

a V-shaped groove driving unit moving the V-shaped groove;

a storage unit storing a position of the V-shaped groove at which the microscope is focused on the optical fiber; and an identification unit identifying an optical fiber, wherein a position of the microscope is fixed, wherein the V-shaped groove driving unit moves the V-shaped groove to a position stored in the storage unit, and wherein the identification unit identifies the optical fiber moved to the position, and wherein the fusion splicing device further comprises a control unit acquiring a feature information of the luminance from the optical fiber and determining whether or not the acquired feature information is within a reference range of the feature information stored in the storage unit.

* * * * *